United States Patent
Mogami

(10) Patent No.: US 8,007,713 B2
(45) Date of Patent: Aug. 30, 2011

(54) SINTERED COMPOSITE MACHINE PART AND MANUFACTURING METHOD THEREOF

(75) Inventor: Michiharu Mogami, Kashiwa (JP)

(73) Assignee: Hitachi Powdered Metals Co., Ltd., Matsudo-chi, Chiba (JP)

( * ) Notice: Subject to any disclaimer, the term of this patent is extended or adjusted under 35 U.S.C. 154(b) by 788 days.

(21) Appl. No.: 11/984,016

(22) Filed: Nov. 13, 2007

(65) Prior Publication Data

US 2008/0110334 A1 May 15, 2008

(30) Foreign Application Priority Data

Nov. 15, 2006 (JP) ................. P2006-309124

(51) Int. Cl.
*B22F 7/02* (2006.01)
(52) U.S. Cl. .............. 419/5; 419/2; 419/29; 419/38
(58) Field of Classification Search ............ None
See application file for complete search history.

(56) References Cited

U.S. PATENT DOCUMENTS

| | | | |
|---|---|---|---|
| 3,280,758 A * | 10/1966 | Leeming et al. | 91/499 |
| 3,709,107 A * | 1/1973 | Alger et al. | 92/169.1 |
| 4,722,824 A * | 2/1988 | Wiech, Jr. | 419/6 |
| 4,799,419 A * | 1/1989 | Krause | 91/499 |
| 5,948,549 A * | 9/1999 | Takayama et al. | 428/676 |
| 6,447,274 B1 * | 9/2002 | Horihata et al. | 418/60 |
| 6,485,540 B1 * | 11/2002 | Kosco | 75/343 |
| 2004/0149083 A1 * | 8/2004 | Takayama et al. | 75/232 |

FOREIGN PATENT DOCUMENTS

| | | |
|---|---|---|
| CN | 87 2 10072 U | 7/1988 |
| JP | 56-169705 | 12/1981 |
| JP | 57-89408 * | 6/1982 |
| JP | 05-078875 | 3/1993 |
| JP | 06-010825 | 1/1994 |
| KR | 20010061817 A | 7/2001 |

* cited by examiner

*Primary Examiner* — Roy King
*Assistant Examiner* — Ngoclan Mai
(74) *Attorney, Agent, or Firm* — The Nath Law Group; Jerald L. Meyer; Jiaxiao Zhang

(57) ABSTRACT

Disclosed are a sintered composite machine part as a cylinder block for piston pumps or piston motors, and a manufacturing method thereof. The machine part has an air-tight main body of sintered porous iron alloy and having an iron oxide layer on the surface; and a sliding part of sintered porous copper alloy being bonded direct to the main body. The sliding part is to be slid in tight contact with a fluid supply/return device. The manufacturing is made by preparing a main body of sintered porous iron alloy and a green compact for sliding part from a raw material metal powder having a composition corresponding to the copper alloy; sintering the green compact for sliding part in contact with the main body to bond the sliding part to the main body by diffused junction; and subjecting the main body to steam treatment to provide an iron oxide layer.

8 Claims, 6 Drawing Sheets

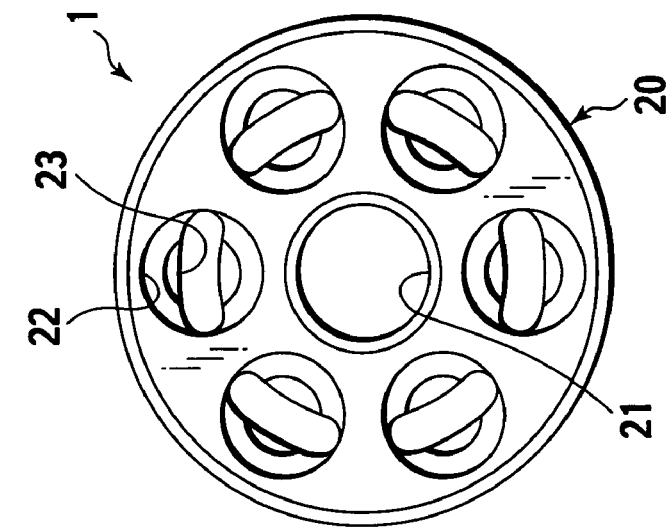
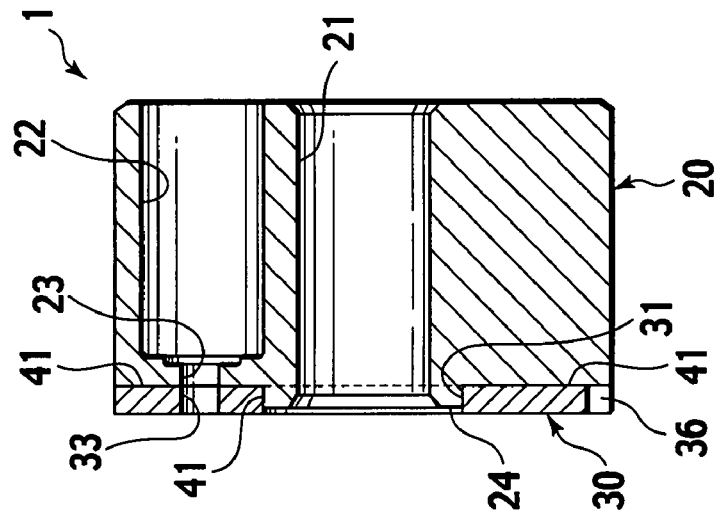
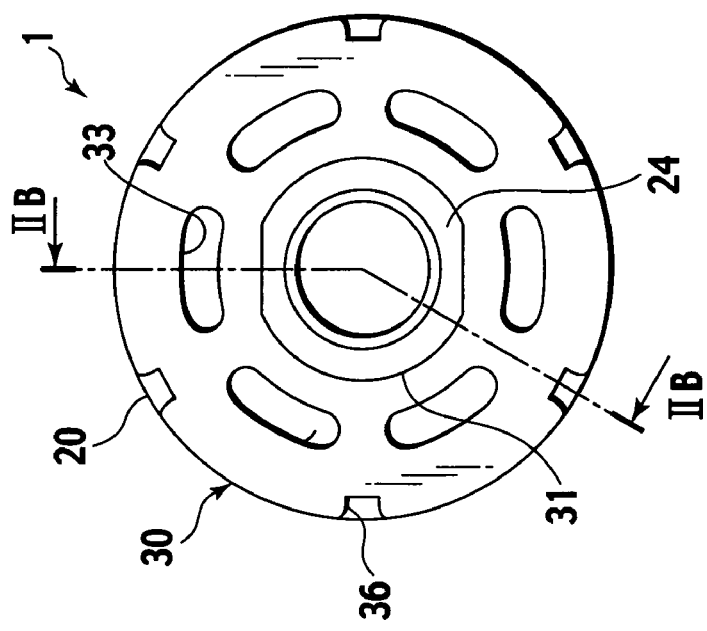

SINTERED COMPOSITE MACHINE PART AND MANUFACTURING METHOD THEREOF

BACKGROUND OF THE INVENTION

1. Field of the Invention

The invention relates to a sintered composite machine part suited to a machine part required to have an airtightness and a locally high sliding property such as a cylinder block used in motion conversion between flowing fluid and rotary mechanism and its manufacturing method, and a cylinder block that can be manufactured by applying the same.

2. Related Art

A cylinder block is an element for composing a skew piston pump or skew piston motor, and is a rotating member having a plurality of cylinder holes with a bottom which are formed in parallel to a rotary shaft at equal intervals along a circumference concentric with the rotary shaft. By using the cylinder block in combination with a piston fitted into each cylinder hole, and a skew plate configured to rotate in connection with the reciprocal motion of the piston, motion can be converted between the flow of the fluid and the rotary motion of the shaft. Then, if fluid (gas) is supplied/discharged in the cylinder holes from outside by way of through-holes on the cylinder hole bottom, the skew plate is rotated by reciprocal motion of the piston, and the system acts as a skew piston pump for converting the ejection pressure of external gas into rotary motion of skew plate. To the contrary, if rotating the skew plate by using an external power source, the external fluid (liquid, gas) is sucked and discharged by reciprocal motion of the piston, and thereby it acts as a skew piston pump for moving the fluid in one direction by way of cylinder holes. For example, in Japanese Patent Application of Laid-Open No. H06-10825, a skew axial piston pump and motor is disclosed, in which the working fluid sucked into the cylinder holes from the low pressure side of a distributor opposing to the end face of the cylinder block is discharged to the high pressure side by rotation of the cylinder block.

The cylinder block like the above is generally formed of ferriferous metal material in order to have enough mechanical strength, and airtightness is required at the same time so as to retain the fluid pressure in the cylinder holes. Accordingly, if it is manufactured by a method of powder metallurgy, it is necessary to prevent leak of fluid by sealing the pores in the sintered material. For this purpose, hitherto, the ferriferous sintered body is treated by steam process (see, for example, Japanese Patent Publication No. 57-026322 and Japanese Patent Applications of Laid-Open Nos. S56-169705 and H05-078875), and by the action of heated steam, the surface of sintered body or the inner wall of pores opened to the surface is oxidized to form a layer of triiron tetraoxide ($Fe_3O_4$), and open pores existing in the surface portion of sintered body are sealed by utilizing volume expansion due to the oxidation of iron.

The cylinder block manufactured by steam treatment of ferriferous sintered body obtained in accordance with powder metallurgy is wear resistant, since a rigid iron oxide layer is formed on the surface. However, the opposite members such as piston and distributor for supplying fluid are easily worn on the contrary. In particular, the cylinder block end face of the cylinder hole bottom side rotating and sliding in a state pressed to the distributor is demanded to enhance the sliding property so as not to damage the opposite members, in order to extend the service life of the working system.

BRIEF SUMMARY OF THE INVENTION

It is an object of the present invention to establish a technology, in connection with a cylinder block manufactured by powder metallurgy, for improving the sliding property of sliding portions without causing damage of the opposite members, and to provide a cylinder block having an airtightness and a locally enhanced sliding property and being capable of preventing damage of opposite members and extending the product life.

It is another object of the present invention to provide a manufacturing method of sintered machine part capable of manufacturing a cylinder block having airtightness and locally enhanced sliding property according to a method of powder metallurgy.

It is another object of the present invention to provide a sintered composite machine part that is airtight and has a local portion capable of exhibiting an excellent sliding property without damaging opposite members.

In order to achieve the above objects, a sintered composite machine part according to one aspect of the present comprises: a main body being composed of sintered porous iron alloy and having an iron oxide layer on the surface to have airtightness; and a sliding part being composed of sintered porous copper alloy and being bonded direct to the main body.

Moreover, a cylinder block composed of sintered composite alloy, constructed as used in combination with a fluid supply/return device and a rotational mechanism cooperative with a piston to make motion conversion between fluid flow and mechanical rotation through reciprocal motion of the piston, according to one aspect of the invention, comprises: a sliding part being composed of sintered porous copper alloy that is arranged to slide in tight contact with the fluid supply/return device; and a main body being composed of sintered porous iron alloy and bonded direct to the main body, and having an iron oxide layer on the surface to have airtightness, wherein the main body has: a cylinder hole in which the piston is to be received; and a through-hole provided on a bottom of the cylinder hole to make supply/return of fluid between the fluid supply/return device and the cylinder hole through the sliding part.

Furthermore, a method of manufacturing a sintered composite machine part comprising: a main body being composed of sintered porous iron alloy and having airtightness; and a sliding part being composed of sintered porous copper alloy and being bonded direct to the main body, according to one aspect of the present invention, comprises: preparing a main body being composed of sintered porous iron alloy; preparing a green compact for sliding part, the green compact having a shape corresponding to the sliding part and being formed of a raw material metal powder having a composition substantially corresponding to said copper alloy; heating the green compact for sliding part in contact with the main body to a temperature lower than the temperature that copper melts, thereby sintering the green compact for sliding part to produce the sliding part and occurring diffusion of copper to bond the sliding part to the main body; and subjecting the main body bonded to the sliding part to steam treatment to provide an iron oxide layer on the surface of the main body, thereby imparting airtightness to the main body.

In accordance with the construction described above, a main body portion requiring strength and a sliding portion having proper hardness and durability are formed integrally, and a composite machine part preferable as a cylinder block of piston pump or piston motor, etc. is hence provided by making use of a method of powder metallurgy, so that an excellent sliding property is exhibited without damaging the opposite members when sliding.

Moreover, it is possible to manufacture a sintered composite machine part efficiently that a main body portion of sintered porous iron alloy material and a sliding portion of sintered porous copper alloy material are formed integrally by utilizing diffused junction. Airtightness is assured by sealing the pores of the main body portion by steam process, and a sintered composite machine part exhibiting a locally excellent sliding property with the sliding portion can be provided. The sintered composite machine part obtained is usable as a desirable machine part such as cylinder block demanding both airtightness and excellent local sliding property. In manufacture of machine parts, the application scope of powder metallurgy is expanded, and the machine parts can be reduced in weight more and more.

In the above construction, it is also possible to further enhance the airtightness by sealing pores in the sliding portion or gaps on the junction interface by resin impregnation. The junction position of the main body and the sliding portion can be determined more accurately and easily by using projection and depression for positioning, and the working efficiency and precision in manufacture can be enhanced.

BRIEF DESCRIPTION OF THE DRAWINGS

FIG. 2A is a side view at one axial end of the cylinder block shown in FIG. 1, FIG. 2B is a sectional view taken along line IIB-IIB in FIG. 2A, and FIG. 2C is a side view at the other axial end of the cylinder block;

Figure 1:
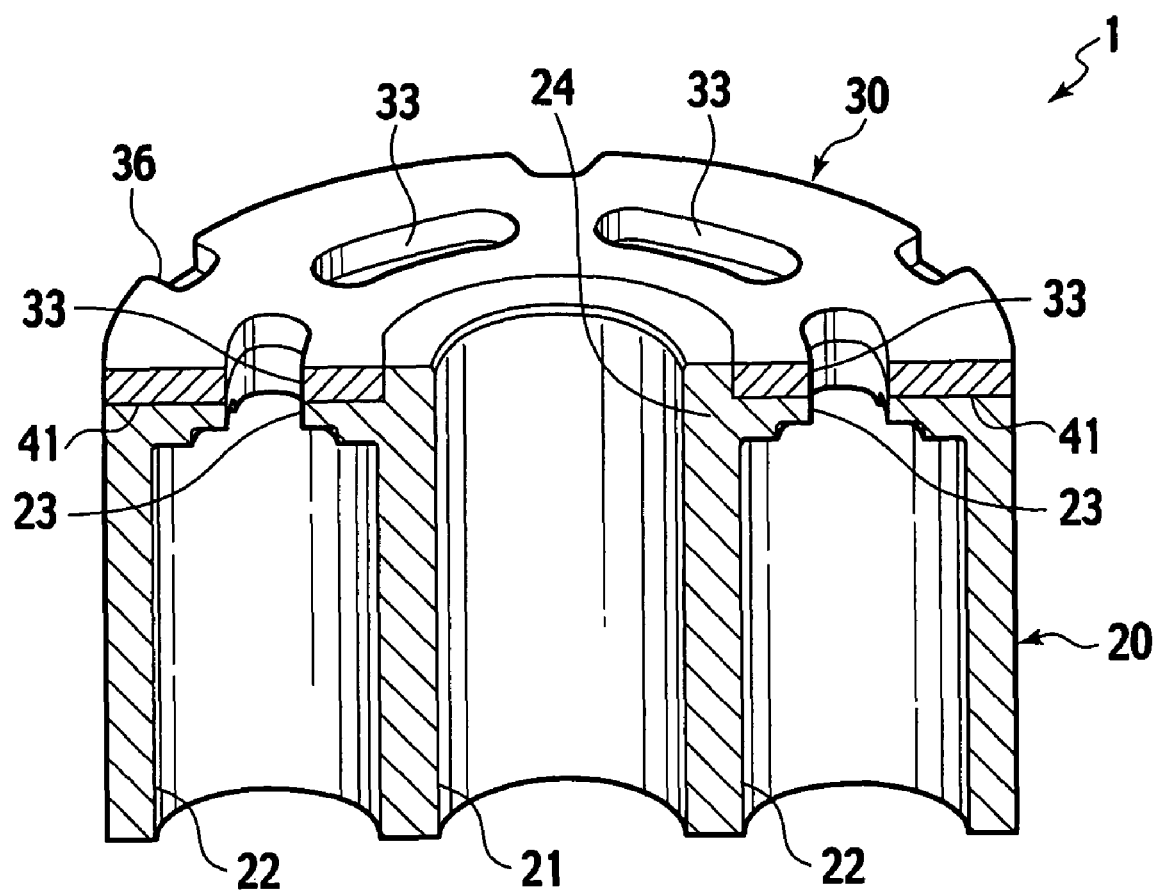
FIG. 1 is a sectional perspective view of a cylinder block as a sintered composite machine part of the invention.

The features and advantages of the sintered composite machine part and the manufacturing method according to the present invention over the conventional art will be more clearly understood from the following description of the embodiments of the present invention.

DETAILED DESCRIPTION OF THE INVENTION

Manufacturing according to powder metallurgy provides a machine part composed of porous alloy material by sintering a green compact obtained by pressing metal powder, and it is capable of reducing the weight of machine part while maintaining the strength thereof, or improving the material characteristic on the basis of metallographic structure which changes depending on the material powder and manufacturing conditions. A machine part requiring strength such as a cylinder block and the like is usually manufactured of ferriferous alloy, and when the cylinder block is manufactured by powder metallurgical method, an oxide layer is formed on the surface of porous iron alloy so that pores are sealed by means of expansion accompanied by the oxidation of iron, in order to assure airtightness.

The cylinder block has portions that slide in contact with other members, and one of them is the inner wall of cylinder hole, and the other is one end face of the cylinder block at which supply and discharge of fluid is made in tight contact with a distributor for supplying and discharging fluid such as gas. The distributor and the end face of block contact in a slightly pressed state so as to prevent the fluid from leaking by the fluid pressure, and they are likely to be broken by sliding action. Therefore, it is effective for extending the product service life to improve the sliding property of the end face of block contacting with the distributor so as to have enough durability against sliding with the distributor.

However, if the hardness of the end face of block is too high, the opposite member may be damaged, or oppositely, if the end face is too soft, the block cannot withstand sliding. For example, if a simple copper layer is laminated on the surface of iron alloy, the copper layer being soft may be deformed to expose fine undulations of the iron alloy surface, which possibly damages the opposite member. In other words, an appropriate hardness should be applied in order to improve the sliding property.

In the light of the background discussed above, the cylinder block of the present invention is divided into a sliding part to contact with the distributor and the other part for main body, and the sliding part is formed of different alloy, i.e. copper alloy. That is, the cylinder block of the present invention is provided as a composite product of a sliding part composed of sintered copper alloy material and a main body composed of sintered iron alloy material that are joined to each other and integrated. As a result, the cylinder block has both mechanical strength and durability against local sliding. Other machine parts than cylinder block requiring local sliding property can also be provided as composite sintered machine parts similarly by dividing them into the sliding part and main body in accordance with the present invention.

In manufacture of sintered composite machine part, if a proper sintering temperature is similar between the iron alloy composition and the copper alloy composition, the main body and the sliding part may be joined and integrated merely by sintering together the green compact for main body and the green compact for sliding part being in contact with each other, after preparing them individually. However, the sintering temperature of copper alloy composition in actual process is generally lower than that of iron alloy composition, and a green compact of copper alloy composition is fused and deformed at the sintering temperature for iron alloy composition, and is likely to permeate into the sintered body of iron alloy composition. In the present invention, while the main body is prepared by sintering in advance a green compact for main body, a green compact for sliding part before sintering is prepared and this is incorporated with the main body, followed by heating them to the sintering temperature of copper alloy composition so as to sinter the green compact for sliding part and concurrently join the produced sliding part to the main body. At this time, the sliding part and the main body are metallurgically bonded direct to each other by metal diffused junction, and the both parts are integrated without resort to adhesive or binder material.

Diffused junction is a method of bonding two members by making use of diffusion of atoms due to heating, specifically, by diffusing atoms in the members through the contact interface thereof. It is roughly classified into solid phase diffused junction that does not involve fusing elements, and liquid phase diffused junction that involves fusing elements. While the integration is possible by liquid phase diffused junction, the product thereof may be deformed by fusion. Therefore the solid phase diffused junction is preferred in the present invention from the viewpoint of dimensional precision, and the heating temperature for integrating is desired to be lower than the temperature that either of the metal components (especially copper as main component) of the green compact is molten. In this connection, diffusion of metal atoms occurs in a state that both surfaces contact tightly with each other, and any particular pressing operation or the like is not essential, but it is preferred to heat the two members while they are vertically laminated so that the two surfaces may tightly contact with each other due to the own weight. The temperature that the metal component(s) melt varies with metallic composition of the green compact, and the heating temperature may be determined appropriately depending on the blend of raw material metal powders.

An embodiment of the sintered composite machine part of the present invention and its manufacturing method is specifically described below.

FIG. 1 is a perspective sectional view of the sintered composite machine part of the present invention constructed as a cylinder block for skew cylinder pump or skew cylinder motor, and its side views seen from both axial end sides are shown in FIGS. 2A and 2C, and a sectional view taken along the line IIB-IIB in FIG. 2A is shown in FIG. 2B.

In FIG. 1, a cylinder block 1 comprises a main body 20 composed of a sintered porous iron alloy material, and a sliding part 30 composed of a sintered porous copper alloy material and bonded to the main body 20, and the main body 20 has an iron oxide layer (not shown in drawings) on its surface in which the pores are sealed by steam treatment to substantially exhibit airtightness. The airtightness of the cylinder block 1 is possibly further enhanced by impregnating resin into pores of the sintered porous copper alloy forming the sliding part and/or small gaps on the junction interface of main body 20 and sliding part 30.

The cylinder block 1 is used in combination with rotating mechanism (such as rotating skew plate) cooperating with the piston and a fluid supply/return device, and fluid flowing motion and rotary motion of rotating mechanism are converted with each other through the reciprocating motion of piston and rotation of cylinder block. At this time, the sliding part 30 slidably contacts with the fluid supply/return device (such as distributor), and the fluid is given/taken between the main body 20 and the fluid supply/return device through the sliding part 30.

More specifically, the main body 20 is a tubular block having a cylindrical shaft hole 21 in the center, and one or a plurality of (three pairs=6 in this embodiment) cylindrical cylinder holes 22 having a bottom are formed in parallel to axial direction of the main body 20, and both of axial ends have end faces perpendicular to the axial direction. The cylinder holes 22 are disposed mutually at equal intervals on the circumference surrounding the central shaft of the main body 20. That is, the cylinder block 1 is formed to be equal to an integrated structure of a plurality of cylinders disposed axis-symmetrically. At the time of use, pistons are slidably fitted into the cylinder holes 22 and coupled to a rotary skew plate that is disposed coaxially with the main body 20 at one end side at which the cylinder holes of the main body 20 opens, and motion conversion can be made between the reciprocal motion of the pistons and the rotary motion of skew plate. At the other end of the main body 20, namely, on the end face of the cylinder bottom side, a boss 24 surrounding the shaft hole 21 is formed to project in the axial direction, and the sliding part 30 of a flat annular shape is bonded to the end face of the main body 20 with the boss 24 fitted into the central hole 34 of the sliding part 30. On the bottom of each cylinder hole 22, through-holes 23, 33 are formed in an arc shape that passes through the center axis of the cylinder holes 22 with centered around the shaft hole 21. The through-holes 23, 33 penetrate through the end portion of the main body 20 and the sliding part 30, communicating between the cylinder holes 22 and the outside. Accordingly, when the sliding part 30 comes into contact with the fluid supply/return device, the fluid can be given/taken between the cylinder holes 22 and the fluid supply/return device. The inner bore shape of the central hole 34 of the sliding part 30 and the outer shape of the boss 24 are not completely circular, but are of incomplete or partially sectioned cylinder. The fluid supply/return device has a flat member having fluid discharge hole and suction hole, such as distributor, and it is disposed coaxially with the cylinder block 1 and brought into contact with the sliding part 30. When the cylinder block 1 rotates, the sliding part 30 slides on the distributor, and the cylinder holes 22 communicate alternately with the discharge hole and suction hole. Therefore, if the fluid supply/return device supplies the fluid into the cylinder block 1 from the discharge hole by force owing to the fluid pressure, the piston is pushed out and the skew plate is rotated to produce rotary driving force. To the contrary, if the skew plate is rotated by using an external drive power source, the reciprocal motion of the coupled piston forces out the fluid from the discharge hole into the cylinder holes, and the fluid is then discharged into the suction hole, thereby working as a pump.

The cylinder block 1 as described above can be manufactured in the following procedure.

Figure 3C:
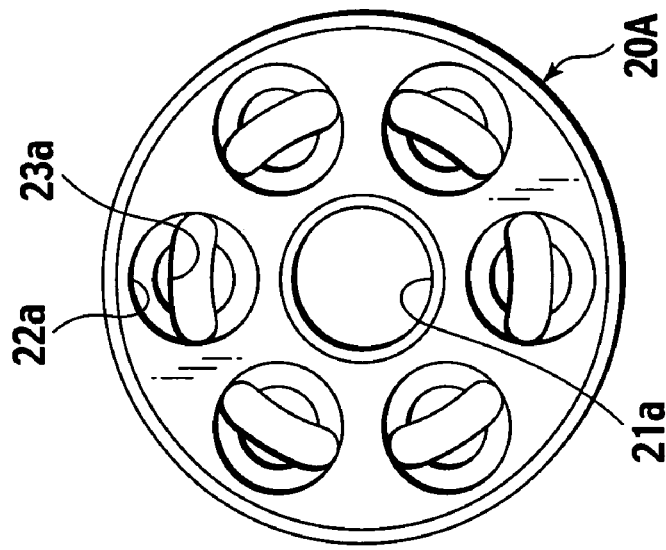
FIG. 3C is a side view at the other axial end of the main body 20A.
Figure 3B:
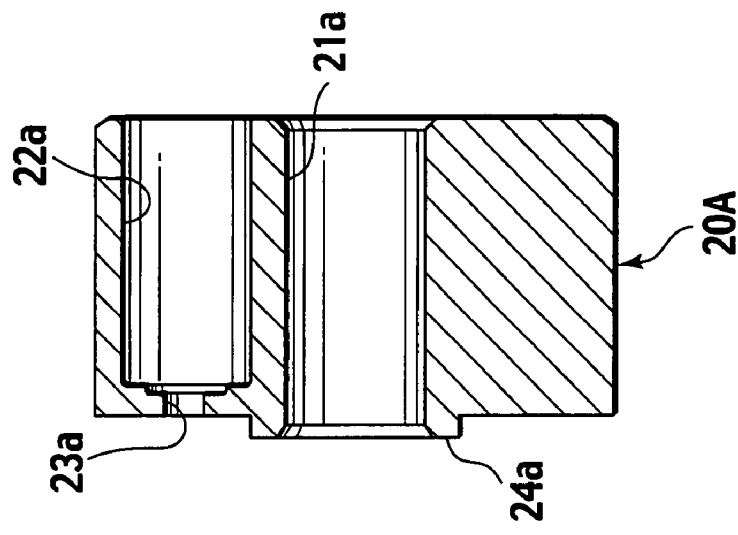
FIG. 3B is a sectional view taken along line IIIB-IIIB in FIG. 3A.
Figure 3A:
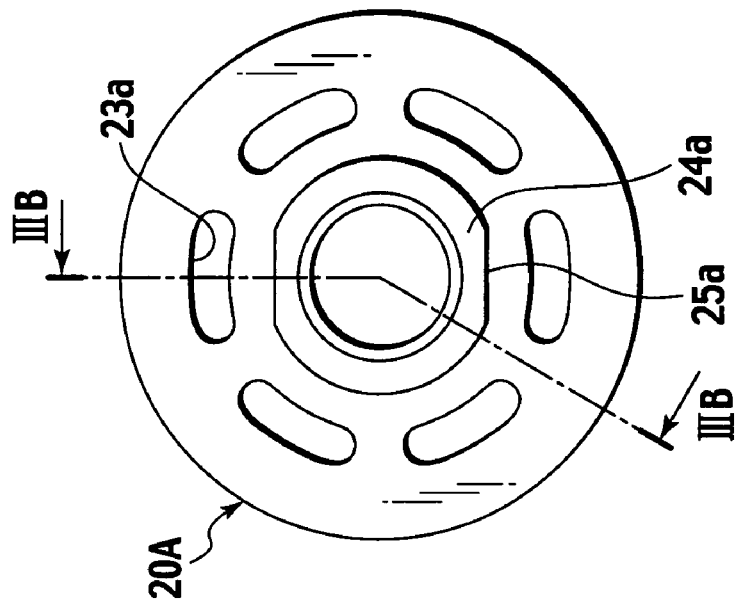
FIG. 3A is a side view at one axial end of main body 20A used in manufacture of the cylinder block.
Figure 4A:
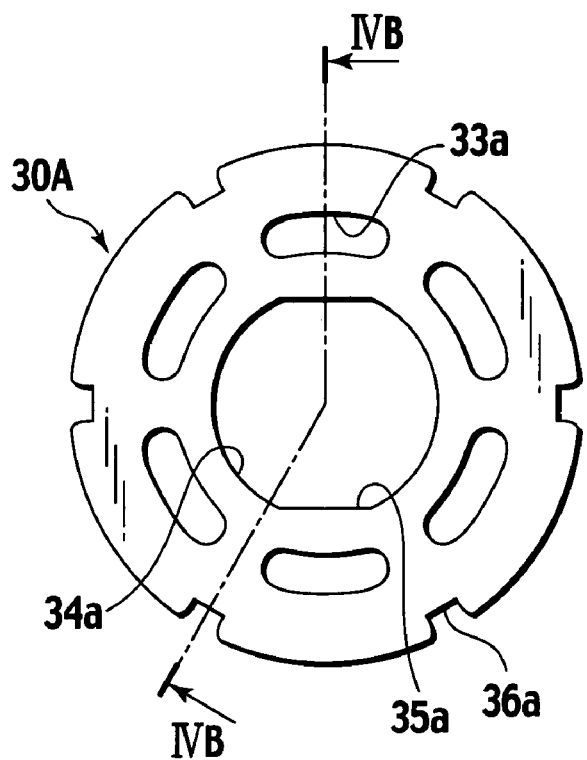
FIG. 4A is a top view of a green compact 30A for sliding part used in manufacture of the cylinder block.
Figure 4B:
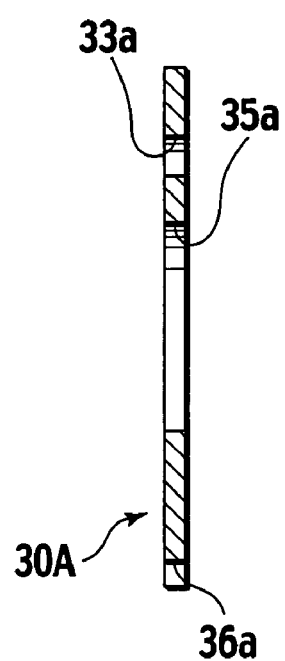
FIG. 4B is a sectional view taken along line IVB-IVB in FIG. 4A.

First, as shown in FIGS. 3A to 3C, a main body 20A of sintered porous iron alloy material is prepared. Next, as shown in FIGS. 4A and 4B, a green compact 30A for sliding part in a shape corresponding to the sliding part is prepared. It is then fitted tightly to the main body 20A and heated to a temperature lower than the temperature at which copper is molten in the compacted powder body 30A, to sinter the green compact 30A for sliding part, so that the sliding part 30 is produced and the copper is diffused at the same time, thereby having the sliding part 30A bonded to the main body 20A. The main body 20A to which the sliding part 30 is bonded is subjected to steam treatment and an iron oxide layer is produced on the surface of the main body 20A to impart airtightness thereto, thereby the main body 20 is completed.

The main body 20A composed of sintered porous iron alloy material is obtained, using simple metal powders and/or alloy powder of components composing the iron alloy, by: preparing a raw material metal powder containing the components in the same composition ratio substantially as the iron alloy; pressing the raw material metal powder with use of a die corresponding to the shape of the main body to form a green compact for main body; and heating and sintering the green compact. The raw material metal powder may contain, as required, zinc stearate or other molding powder lubricant.

The composition of the iron alloy is, from the viewpoint of mechanical strength, an iron alloy composition such as Fe—C alloy, Fe—Cu—C alloy and Fe—Ni—Cu—C alloy, and the raw material metal powder may be prepared by properly blending graphite powder, copper powder, nickel powder, or various alloy powders of plural components selected from iron, carbon, copper and nickel, depending on the composition of iron alloy. For example, a raw material metal powder is prepared by mixing graphite powder into a powder of iron alloy containing, as required, copper and/or nickel. The ratio of components in the blended raw material metal powder is preferably C: about 0.4 to 1.2 mass %, Cu: 0 to about 5 mass %, and Ni: 0 to about 5 mass %.

The green compact for main body is obtained by: preparing a die and punches in a shape designed in consideration of the shape of main body and volume changes during sintering; filling the die with the raw material metal powder; and pressing it by upper and lower punches. The density of the green compact for main body is preferably about 6.2 to 7.2 $Mg/m^3$, and if less than 6.2 $Mg/cm^3$, pores are difficult to be sealed sufficiently in steam treatment described below, and airtightness is thus not achieved. The green compact with density of more than 7.2 Mg/m³ demands an excessive pressure in the press forming, and a greater load is applied to the manufacturing apparatus.

The green compact for main body is sintered by heating it to a temperature in a range of 1000 to 1300 degrees C. If the heating temperature is less than 1000 degrees C., neck growth among powder particles is not enough, and the alloying components such as carbon and copper are not diffused sufficiently in the matrix, resulting in decrease in strength of the matrix. If the heating temperature exceeds 1300 degrees C., variations of dimensional changes are significant, or a liquid phase may be produced depending on the alloying components or contents, which readily cases deformation. The sintering atmosphere is similar to those of the conventional sintering operation for ferriferous alloy. Examples of sintering atmosphere include ammonia cracked gas, butane denatured gas, nitrogen gas and the like.

The sintered main body 20A is composed of a porous iron alloy of density of about 6.2 to 7.3 Mg/m³, and is a tubular block substantially the same as the main body 20 shown in FIG. 1, excepting that its surface is not covered with iron oxide layer and is hence not airtight. It includes therefore a cylindrical shaft hole 21a at the center, cylinder holes 22a parallel to the shaft hole and disposed at equal intervals on the circumference surrounding the shaft hole 21a, and through-holes 23a communicating the cylinder holes 22a with the outside by penetrating the end portion of the main body 20A in the bottom of each cylinder hole 22a, in which a boss 24a surrounding the shaft hole 21a projects in the axial direction at other end of the main body 20A. The outer shape of the boss 24a is not a completely circular but an incomplete or partially sectioned cylinder, having a partial notch 25a (two notches are provided in this embodiment), which facilitates positioning for assembling the green compact 30A for sliding part into the main body 20A. The number of notches provided may be only one or plural, and it is preferred that plural notches are disposed axis-symmetrically. If a strict dimensional precision is demanded for the main body 20, the sintered main body 20A may be finished to a desired dimensional precision by sizing or dimensional correction, or slight additional machining prior to the subsequent processes.

Next, the green compact 30A for sliding part is prepared in a shape corresponding to the sliding part 30 as shown in FIGS. 4A and 4B. The green compact 30A for sliding part is obtained by: preparing a raw material metal powder in a composition corresponding substantially to the copper alloy composing the sliding part 30; and pressing and forming the raw material metal powder by using a die in a shape corresponding to the sliding part 30. The material metal powder may be blended with, as required, zinc stearate or other molding powder lubricant.

The copper alloy composition of the sliding part 30 is preferably a copper alloy containing at least one alloying component selected from the group consisting of tin, nickel and zinc, such as Cu—Sn alloy, Cu—Ni alloy and Cu—Zn alloy, and the raw material metal powder can be prepared depending on the composition of the copper alloy, using properly copper powder, tin powder, nickel powder, zinc powder, or alloy powders composed of plural components of copper, tin, nickel and zinc. For example, a copper alloy powder containing tin, nickel and/or zinc may be used as the raw material metal powder. The blending ratio of components may be properly adjusted depending on the hardness of the opposite member (such as fluid supply/return device or distributor), so that the copper alloy may have an appropriate hardness. When the opposite member is composed of a general iron alloy, the contents of tin, nickel and zinc may be desired to be Sn: 0.5 to 15 mass %, Zn: 1 to 25 mass %, and Ni: 1 to 5 mass %, respectively, and the sum is desired to be about 40 mass % or less of the total mass.

The green compact 30A for sliding part 30A is obtained by: preparing a die and punches in a shape designed in consideration of shape of the sliding part and volume changes during sintering; filling it with the raw material metal powder; and pressing it by upper and lower punches. The density of the green compact 30A for sliding part is preferably about 6.6 to 7.4 Mg/m³, and if it is less than 6.6 Mg/cm³, the strength of the sintered body obtained is lowered, and the green compact with the density of more than 7.4 Mg/m³ demands an excessive pressure in press forming, and a greater load is applied to the manufacturing apparatus.

The green compact 30A for sliding part has a flat annular plate having a central hole 34a, and the inner shape of the central hole 34 of the green compact 10A for sliding part is such an incomplete or partially sectioned cylindrical shape that the green compact has a positioning part 35a corresponding to the outer shape of the boss 24a. When the boss 24a of the main body 20A is fitted into the central hole 34a of the green compact 30A for sliding part, the notch 25a and the positioning part 35a are engaged with each other, and the green compact 30A for sliding part is positioned at the coinciding position of the through-hole 23a of the main body 20A and the through-hole 33a of the green compact 30A for sliding part. In this embodiment, on the outer circumference of the green compact 30A for sliding part, a plurality of notches 36a are formed axis-symmetrically to alleviate the tensile stress caused by contraction at the time of sintering, thereby preventing deviation of position between through-holes 33 and 23 in the subsequent step of sintering with diffused junction. This effect is particularly notable when the sliding part is large in size.

When the boss 24 is fitted into the central part 34a and the green compact 30A for sliding part is fitted tightly to the main body 20A, the green compact 30A for sliding part is positioned in the circumferential direction by engagement of notch 25a and positioning part 35a, and the through-hole 33a of the green compact 30A for sliding part and the through-hole 23a of the main body 20A communicate on the straight with each other. In this state, they are heated to a temperature lower than the temperature that copper melts to sinter the green compact 30A for sliding part, thereby the sliding part 30 is produced and the copper in the sliding part compacted powder body 30A is diffused concurrently into the vicinity of the contact interface of the main body 20A. As a result, the sliding part 30 is metallurgically bonded direct to the main body 20A to be formed integrally. The heating temperature is preferably 600 to 1000 degrees C. If the temperature is less than 600 degrees C., neck growth produced among powder particles in the green compact 30A for sliding part may not be enough or copper diffusion may be insufficient, and sintering and diffused junction of the sliding part and the main body may be insufficient. To the contrary, if the heating temperature exceeds 1000 degrees C., deformation is likely to occur due to production of liquid phase in the green compact 30A for sliding part. The sintering atmosphere is similar to that of the conventional copper alloy sintering operation, and its examples include ammonia cracked gas, butane denatured gas, nitrogen gas and the like.

In the heating step described above, diffused junction on the contact interface of main body 20A and green compact 30A for sliding part does not require pressing in particular. However, since the diffused junction is promoted by tight contact of the interface, it is preferred to apply light pressing force between the both members to contact tightly with each other on the heating, for the sake of producing firm and stable joint. For example, the main body 20A may be mounted on the green compact 30A for sliding part while they are fitted to each other, so that the load of the main body 20A is applied as pressing force on the contact interface. Alternatively, spindle or the like may be used for applying its load as pressing force.

If diffusion of element(s) during the heating is active, the boundary or joint of the joined main body 20A and sliding part 30A may become rather uncertain. However, it is still distinguishable in the sectional microscopic image of the product as shown in FIG. 5 that will be described below.

The sintered sliding part 30 is composed of a porous copper alloy having a density of about 6.8 to 7.8 $Mg/m^3$. The main body 20A to which the sliding part 30 is bonded is composed of a porous iron alloy having no iron oxide layer, and it is subsequently subjected to steam treatment to impart airtightness. Thus an iron oxide layer is formed on the surface of the main body 20A, and pores on the surface are sealed off.

The specific manner of steam treatment may be properly selected from the conventional methods, and, for example, the main body 20A to which the sliding part 30 is bonded is introduced into continuous or closed type steam processing furnace, and heated at 500 to 600 degrees C. in steam atmosphere. The porous iron alloy composing the main body 20A is oxidized on the surface (including the inner wall of open pores) by contacting with steam, and a layer of triiron tetraoxide ($Fe_3O_4$) is formed. It is expanded to close and seal the pores. At this time, the closed type steam processing furnace as disclosed in Japanese Patent Application Publication No. S57-026322 may be used, and, if the steam pressure in the furnace is raised to 2 atmospheric pressures (about 200 kPa) or more, the steam acts into the depth of pores and the oxide layer is formed thick, resulting in enhanced sealing degree and improved airtightness.

In the cylinder block 1 thus having the pores sealed by steam treatment, as shown in FIG. 1 and FIGS. 2A to 2C, the main body 20 and the sliding part 30 are joined or directly bonded by diffused junction at the interface 41, and hence they are integrated without using any binder material. The surface of the main body 20 and the inner wall of the opening pores are oxidized and sealed with oxide layer, so that airtightness is imparted. The sliding part 30 is positioned accurately with respect to the circumferential direction to the main body 20 by engagement of notches 25a of the boss 24a and the positioning part 35a, and the through-hole 23 and through-hole 33 are straightly connected without step difference. Instead of engagement of notches 25a and positioning part 35a, they may be positioned by providing mutually engaging projection and depression on the contact interface of the green compact 30A for sliding part and the main body 20A. In this case, one of the projection and depression is provided at an end face of the main body 20A, and the other is formed at a corresponding position of the green compact 30A for sliding part.

The interface 41 is firmly integrated by diffused junction, but a slight gap may be present. The sintered copper alloy for composing the sliding part is still porous without being coated with oxide layer, and the cylinder block 1 as a whole may be only a little permeable at the interface 41 and the sliding part 30. However, the airtightness is possibly enhanced if subjecting the cylinder block 1 to resin impregnation treatment. In the resin impregnation treatment, the outer surface of the sliding part 30 and/or interface 41 is brought into contact with a curable resin, and the pores of the sliding part 30 and/or gaps on the interface 41 are impregnated and filled with the resin. After cleaning and removing the excessive resin remaining on the surface, the impregnated resin is cured and pores are sealed off. Examples of the curable resin include thermosetting resin and anaerobic adhesive. The anaerobic adhesive is a composition mainly composed of acrylate monomer as a curable component and containing polymerization initiator having a combination of peroxide and amine, and when the anaerobic adhesive impregnates the pores or gaps and air is cut off, the initiator reacts and hardens at the temperature that the monomer polymerizes.

EXAMPLES

The cylinder block was manufactured in the following procedure, and the state of diffused junction of the main body and the sliding part was observed.

(Raw Material Metal Powder)

Copper powder 1.5 mass %, graphite powder 1.0 mass %, zinc stearate powder 0.8 mass % as molding powder lubricant, and the balance iron powder were blended and mixed to prepare a raw material metal powder for main body.

A zinc stearate powder 0.8 mass % as molding powder lubricant was added and mixed in a copper alloy powder of tin 10 mass % and the balance copper and inevitable amount of impurities, to prepare a raw material metal powder for sliding part.

(Preparation of Main Body 20A)

The material metal powder for main body was pressed to form a green compact for main body at compact density of 6.6 $Mg/m^3$ in the form as shown in FIGS. 3A to 3C. This green compact for main body had outside diameter of 60 mm, length of 32 mm, pore size of 16 mm corresponding to the shaft hole 21a, inside diameter of 13.2 mm corresponding to the cylinder hole 22a, hole width of 4.8 mm corresponding to the arc-shaped through-hole 33a, outside diameter of 25.6 mm corresponding to the boss 24a, projection height of 2.3 mm corresponding to the boss 24a, and notch width of 24 mm corresponding to the notch 25a.

The green compact obtained above was heated and sintered in ammonia cracked gas atmosphere at 1130 degrees C., to prepare the main body 20A.

(Preparation of Green Compact 30A for Sliding Part)

The raw material metal powder for sliding part was pressed to form a green compact 30A for sliding part at compact density of 7.25 $Mg/m^3$ in the form as shown in FIGS. 4A and 4B. This green compact for sliding part had outside diameter of 60 mm, thickness of 2.4 mm, hole width of 4.8 mm in arc-shaped through-hole 33a, inside diameter of 25.6 mm of central hole 34a, and width of 24 mm of positioning part 35a.

(Sintering and Integrating)

The boss 24a of the main body 20A was fitted into the central hole 34a of the green compact 30A for sliding part, and the notch 25a and positioning part 35a were engaged with each other. While the green compact 30A for sliding part compacted powder body 30A was brought into contact with the main body 20A, they were disposed so that the main body 20A was mounted on the green compact 30A for sliding part. Placing them on the sintering tray, heating at 870 degrees C. in ammonia cracked gas atmosphere was subjected to sinter the green compact for sliding part compacted and concurrently bond it to the main body 20A by solid phase diffusion for integration. As a result, a cylinder block before steam treatment was obtained.

(Observation of Joint Interface)

Figure 5A:
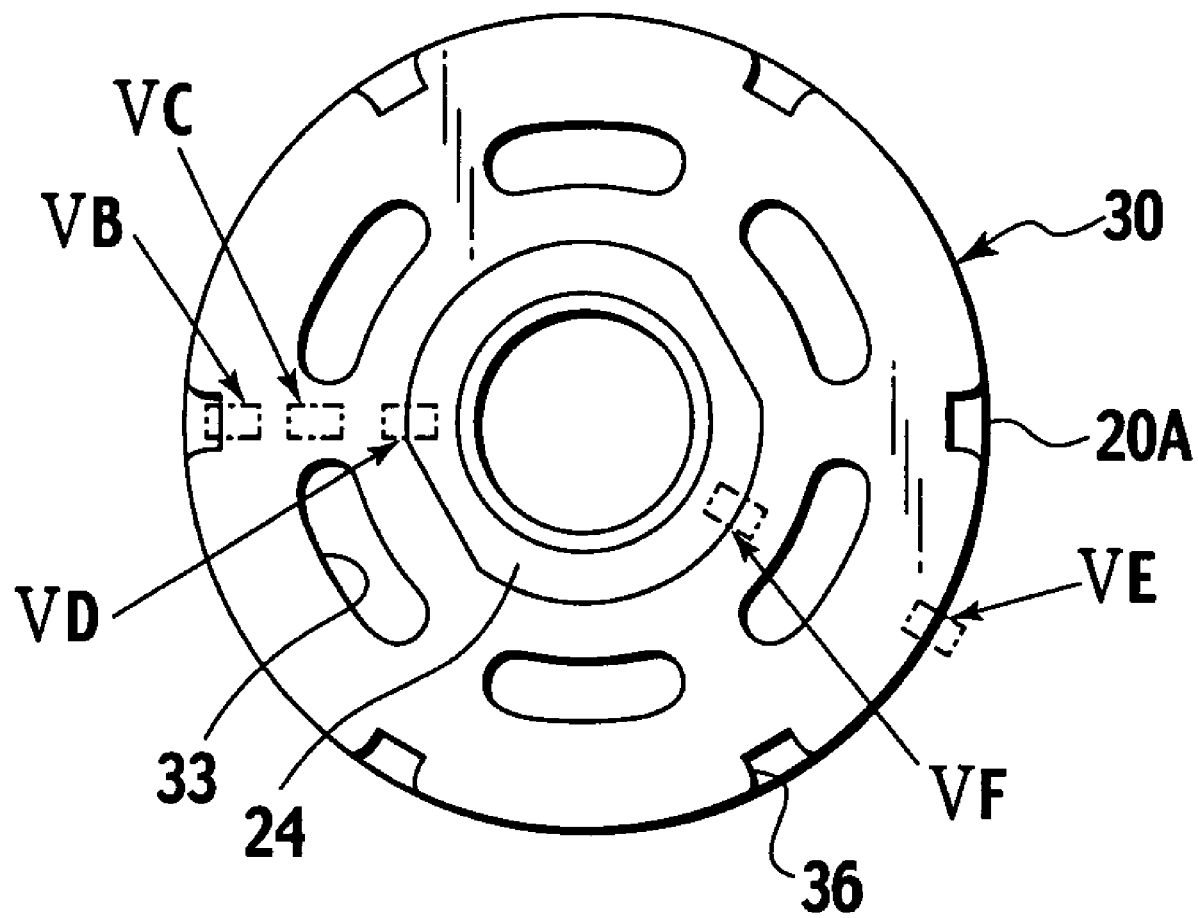
FIG. 5A is a diagram showing the portions that sectional microscopic images are taken.
Figure 5B:
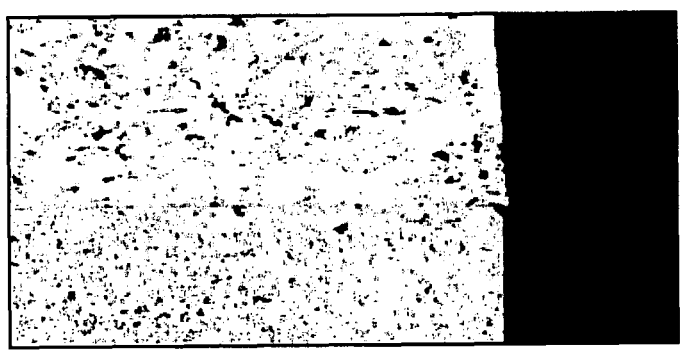
FIG. 5B to FIG. 5F are microscopic images of the section at the portions shown in FIG. 5A.
Figure 5C:
Figure 5D:
Figure 5E:
Figure 5F:
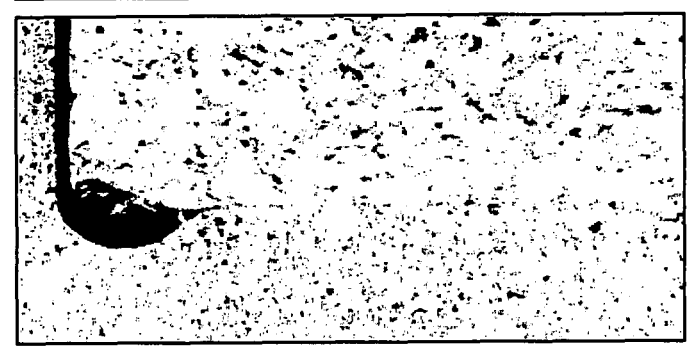

Microscopic images of sections were taken for the prepared cylinder block before steam treatment at the positions indicated by VB, VC, VD, VE, VF in FIG. 5A, and the joining state on the interface of main body 20A and sliding part 30 was observed. FIGS. 5B to 5F shows the microscopic images of sections at positions indicated by VB, VC, VD, VE, VF, and in each photograph, the upper side is the sliding part 30 and the lower side is the main body 20A. At any position, large gap is not recognized although slight gaps are found at the joint interface of both members, and it is confirmed that a favorable bond was produced.

(Steam Treatment and Resin Impregnation)

The prepared cylinder block was subjected to steam treatment for about 60 minutes at 550 to 600 degrees C., and an oxide layer was formed on the surface, thereby an airtight cylinder block was obtained. It was confirmed that the cylinder block functioned favorably when it was operated with assembling the piston, rotary mechanism and distributor.

Moreover, the sliding part 30 of the cylinder block after the above steam treatment was dipped sufficiently in anaerobic adhesive, and was then lifted. The adhesive liquid remaining on the surface was removed and cleaned, and it was left stand until the adhesive was cured. For this cylinder block, observation of the section was made in the same manner as above, and it was confirmed that joint of the interface was favorably maintained, and the pores of the sliding part 30 and small gaps at the joint interface were impregnated and filled with the adhesive. On the surface of the main body 20, an iron oxide layer of thickness of about 5 microns was observed.

It must be understood that the invention is in no way limited to the above embodiments and that many changes may be brought about therein without departing from the scope of the invention as defined by the appended claims.

What is claimed is:

1. A method of manufacturing a sintered composite machine part comprising: a main body being composed of sintered porous iron alloy and having airtightness; and a sliding part being composed of sintered porous copper alloy and being bonded direct to the main body, the method comprising:
    preparing the main body being composed of sintered porous iron alloy and having one of a projection and a depression that are engaged with each other;
    preparing a green compact for the sliding part, the green compact having a shape corresponding to the sliding part, having the other of the projection and the depression and having a plurality of axis-symmetrically formed notches on the outer circumference thereof, and being formed of a raw material metal powder having a composition substantially corresponding to said copper alloy;
    contacting tightly the green compact for the sliding part with the main body, and engaging the projection and the depression with each other to position the green compact for the sliding part to the main body;
    heating the green compact for the sliding part in contact with the main body to a temperature lower than the temperature that copper melts, thereby sintering the green compact for the sliding part to produce the sliding part and occurring diffusion of metal to bond the sliding part to the main body; and
    subjecting the main body bonded to the sliding part to steam treatment to provide an iron oxide layer on the surface of the main body, thereby imparting airtightness to the main body.

2. The manufacturing method of claim 1, wherein the sintered composite machine part is constructed as a cylinder block for skew piston pumps or skew piston motors, and the sliding part is constructed as sliding in press contact with a fluid supply/return device.

3. The manufacturing method of claim 1, wherein the copper alloy composing the sliding part contains copper and at least one metal which is selected from the group consisting of tin, nickel and zinc.

4. The manufacturing method of claim 1, wherein the iron alloy composing the main body contains carbon.

5. The manufacturing method of claim 4, wherein the iron alloy further contains copper, or, both of copper and nickel.

6. The manufacturing method of claim 1, further comprising:
    impregnating a resin material into pores of the sliding part and/or a gap remained on the interface of the main body and the sliding part to seal.

7. The manufacturing method of claim 6, wherein the resin comprises a curable resin which is usable as anaerobic adhesive.

8. The manufacturing method of claim 1, wherein the main body composed of sintered porous iron alloy is prepared by:
    preparing a green compact for main body, the green compact having a shape corresponding to the main body and being formed of a raw material metallic powder having a composition substantially corresponding to said iron alloy; and
    sintering the green compact for main body at a temperature of 1000 to 1300 degrees C.,
    wherein the temperature at the heating the green compact for sliding part in contact with the main body is 600 to 1000 degrees C.

* * * * *